(12) United States Patent
Tardy et al.

(10) Patent No.: US 12,119,127 B2
(45) Date of Patent: Oct. 15, 2024

(54) STORAGE DEVICE HAVING NUCLEAR FUEL ASSEMBLY RECEIVING HOUSINGS THAT ARE FORMED USING A FIRST NOTCHED FLAT BAR WITH BORON AND A SECOND NOTCHED FLAT BAR WITHOUT BORON

(71) Applicant: ORANO NUCLEAR PACKAGES AND SERVICES, Montigny-le-Bretonneux (FR)

(72) Inventors: Marcel Tardy, Chatillon (FR); Stéphane Nallet, Le Mesnil Saint Denis (FR)

(73) Assignee: ORANO NUCLEAR PACKAGES AND SERVICES, Montigny-le-Bretonneux (FR)

( * ) Notice: Subject to any disclaimer, the term of this patent is extended or adjusted under 35 U.S.C. 154(b) by 183 days.

(21) Appl. No.: 17/756,921

(22) PCT Filed: Dec. 8, 2020

(86) PCT No.: PCT/FR2020/052337
§ 371 (c)(1),
(2) Date: Jun. 6, 2022

(87) PCT Pub. No.: WO2021/116593
PCT Pub. Date: Jun. 17, 2021

(65) Prior Publication Data
US 2023/0005631 A1 Jan. 5, 2023

(30) Foreign Application Priority Data
Dec. 11, 2019 (FR) ........................................ 1914132

(51) Int. Cl.
*G21F 5/008* (2006.01)
*G21C 19/40* (2006.01)

(52) U.S. Cl.
CPC ............. *G21F 5/008* (2013.01); *G21C 19/40* (2013.01)

(58) Field of Classification Search
CPC .......... G21F 5/008; G21C 19/07; G21C 19/40
(Continued)

(56) References Cited

U.S. PATENT DOCUMENTS

| 5,032,348 A | 7/1991 | Blum et al. |
| 2009/0207962 A1* | 8/2009 | Maeda .................... G21C 19/07 376/272 |

(Continued)

FOREIGN PATENT DOCUMENTS

| FR | 3044819 A1 | 6/2017 |
| JP | 2006200939 A | 8/2006 |

OTHER PUBLICATIONS

International Search Report for PCT/FR2020/052337 dated Mar. 18, 2021.

(Continued)

*Primary Examiner* — Peter M Poon
*Assistant Examiner* — Daniel Wasil
(74) *Attorney, Agent, or Firm* — Pearne & Gordon LLP

(57) ABSTRACT

A storage device for storing and/or transporting nuclear fuel assemblies. The storage device includes a number N of adjacent recesses. Some of the recesses created by means of notched, intersecting and stacked plates. In at least one transverse plane, at least one of the adjacent recesses has an inner surface which defines the recess. The adjacent recess being formed in part by a first surface of a first notched plate made with boron and a first surface of a second notched plate made without boron.

18 Claims, 5 Drawing Sheets

(58) Field of Classification Search
USPC .......................................................... 376/272
See application file for complete search history.

(56) References Cited

U.S. PATENT DOCUMENTS

2018/0308595 A1* 10/2018 Tardy ..................... G21C 19/07
2018/0350476 A1   12/2018 Delage et al.

OTHER PUBLICATIONS

Written Opinion for PCT/FR2020/052337 dated Mar. 18, 2021.
Search Report for French application No. FR1914132 dated Sep. 2, 2020.
Corresponding Japanese Patent Application No. 2022-533573, Notice of Reasons for Rejection, dated May 29, 2024.

* cited by examiner

STORAGE DEVICE HAVING NUCLEAR FUEL ASSEMBLY RECEIVING HOUSINGS THAT ARE FORMED USING A FIRST NOTCHED FLAT BAR WITH BORON AND A SECOND NOTCHED FLAT BAR WITHOUT BORON

CROSS-REFERENCE TO RELATED APPLICATIONS

This is a National Stage of PCT international application PCT/FR2020/052337, filed on Dec. 8, 2020, which claims the priority of French Patent Application No. 1914132, filed Dec. 11, 2019, both of which are incorporated herein by reference in their entirety.

TECHNICAL FIELD

The present invention relates to the field of transporting and/or storing nuclear fuel assemblies, preferably spent assemblies wherein the fuel has been irradiated.

PRIOR ART

Such a device, also known as a storage "basket" or "rack", comprises a plurality of adjacent housings each capable of receiving a nuclear fuel assembly.

This storage device, intended to be housed in a cavity of a container, is designed to be able to simultaneously fulfil three essential functions, which will be briefly described hereinafter.

This consists firstly of the function of thermal transfer of the heat released by the fuel assemblies. Generally, aluminium or one of the alloys thereof is used, due to the good thermal conduction properties thereof.

The second function relates to neutron absorption, and the concern of maintaining the subcriticality of the storage device when the latter is loaded with fuel assemblies. This is carried out using neutron-absorbing materials, such as boron.

Finally, the third essential function relates to the mechanical strength of the device. It is noted that the overall mechanical strength of the device must be compatible with regulatory safety requirements for the transport/storage of nuclear materials, particularly in respect of so-called "free fall" tests.

From the prior art, forming the basket by superimposing stages produced using stacked and interlocked structural assemblies with notches, is known. These assemblies are also produced using the same aluminium-based material, comprising a certain boron density in order to fulfil the neutron absorption functions, and achieve the sought effective multiplication factor "Keff".

However, the embodiment of such structural assemblies with notches with boron proves to be particularly costly, strongly impacting the overall production cost of the storage device.

DISCLOSURE OF THE INVENTION

The aim of the invention is therefore that of remedying the drawback mentioned above, in relation to the embodiments of the prior art.

For this purpose, the invention relates to a storage device for transporting and/or storing nuclear fuel assemblies, the storage device being intended to be housed in the cavity of a container for transporting and/or storing nuclear fuel assemblies, and including a number N of adjacent housings, each intended to receive a nuclear fuel assembly, and at least some of the N adjacent housings being produced using flat bars with notches, interlocked and stacked in a stacking direction parallel with a central longitudinal axis of the storage device.

According to the invention, in at least one transverse plane of the storage device passing through the N adjacent housings, at least one of these adjacent housings, and preferably each of a plurality of housings from these N adjacent housings, has an inner housing delimiting surface formed in part by:

a first surface of a first flat bar with notches produced with boron, and of which a second surface opposite the first surface contributes to the formation of the inner housing delimiting surface of at least one or more others of the N adjacent housings; and a first surface of a second flat bar with notches produced without boron, and of which a second surface opposite the first surface contributes to the formation of the inner housing delimiting surface of at least one or more others of the N adjacent housings.

The originality of the invention thus lies in the heterogeneity of the flat bars forming a single housing intended to receive a nuclear fuel assembly, in particular by providing at least a second flat bar with notches produced without boron. This principle results from an unexpected observation. Indeed, the manufacturing cost proves to be greatly reduced when the housing is produced with non-borated flat bars and with other flat bars having a certain boron content, compared to a conventional solution resulting in the same effective multiplication factor, and where all the flat bars contain boron in a content less than said certain boron content cited above. In other words, the invention provides for associating non-borated flat bars and borated flat bars with a boron content greater than the homogeneous content provided in a solution with equivalent performances of the prior art.

This principle advantageously helps reduce the production costs of the storage devices, while having high performances in terms of criticality.

The invention also provides at least any one of the following optional features, taken in isolation or in combination.

Preferably, each of a plurality of transverse planes of the storage device passing through each of the N adjacent housings, at least one of these adjacent housings, and preferably each of a plurality of housings from these N adjacent housings, has an inner housing delimiting surface formed in part by:

a first surface of a first flat bar with notches produced with boron, and of which a second surface opposite the first surface contributes to the formation of the inner housing delimiting surface of at least one or more others of the N adjacent housings; and a first surface of a second flat bar with notches produced without boron, and of which a second surface opposite the first surface contributes to the formation of the inner housing delimiting surface of at least one or more others of the N adjacent housings.

Even more preferably, this feature is observed in all the transverse planes of the storage device, or substantially all these planes.

Preferably, the N adjacent housings are divided into peripheral housings and inner housings, and in a transverse plane or in each of a plurality of transverse planes of the storage device passing through each of the N adjacent housings, at least 50% of the peripheral housings each have an inner housing delimiting surface formed in part by:
- a first surface of a first flat bar with notches produced with boron, and of which a second surface opposite the first surface contributes to the formation of the inner housing delimiting surface of at least one or more others of the N adjacent housings; and
- a first surface of a second flat bar with notches produced without boron, and of which a second surface opposite the first surface contributes to the formation of the inner housing delimiting surface of at least one or more others of the N adjacent housings.

Preferably, in a transverse plane or in each of a plurality of transverse planes of the storage device passing through each of the N adjacent housings, at least 50% of the N adjacent housings each have an inner housing delimiting surface formed in part by:
- a first surface of a first flat bar with notches produced with boron, and of which a second surface opposite the first surface contributes to the formation of the inner housing delimiting surface of at least one or more others of the N adjacent housings; and
- a first surface of a second flat bar with notches produced without boron, and of which a second surface opposite the first surface contributes to the formation of the inner housing delimiting surface of at least one or more others of the N adjacent housings.

Preferably, in a transverse plane or in each of a plurality of transverse planes of the storage device passing through each of the N adjacent housings, at least one of these adjacent housings, and preferably each of a plurality of housings from these N adjacent housings, has an inner housing delimiting surface having a square or rectangular general cross-section, and formed by:
- a first surface of a first flat bar with notches produced with boron, and of which a second surface opposite the first surface contributes to the formation of the inner housing delimiting surface of at least one or more others of the N adjacent housings;
- a first surface of a second flat bar with notches produced without boron, and of which a second surface opposite the first surface contributes to the formation of the inner housing delimiting surface of at least one or more others of the N adjacent housings; and
- two other flat bars with notches.

Furthermore, the first flat bar, the second flat bar and the two other flat bars respectively form the four sides of the inner housing delimiting surface having a square or rectangular general cross-section.

Preferably, said two other flat bars with notches are formed respectively by:
- two first flat bars with notches produced with boron; or
- two second flat bars with notches produced without boron; or
- a first flat bar with notches produced with boron and a second flat bar with notches produced without boron.

Preferably, the flat bars with notches stacked and interlocked inside the storage device are either first flat bars with notches produced with boron, preferably with the same boron content, or second flat bars with notches produced without boron.

Preferably, at least a first flat bar with notches is produced in one piece, preferably from an aluminium alloy comprising boron, and/or in that at least a first flat bar with notches is provided with a coating comprising boron, preferably applied on an aluminium alloy material.

Preferably, at least a second flat bar with notches is made from an aluminium alloy devoid of boron.

Preferably, the stacked and interlocked flat bars form together partitions for delimiting the adjacent housings, each partition extending along the entire height of the storage device or along substantially this entire height, and each partition being formed:
- by the stack of first flat bars with notches; or
- by the stack of second flat bars with notches; or
- by alternating first and second flat bars with notches; or
- by alternating first and second flat bars with notches, between which structural elements, preferably made of steel, are also arranged.

In this regard, first flat bars with notches with different boron contents can be provided within the same partition, even if preferably, the boron content in the first flat bars remains constant within the same partition. Even more preferably, the boron content in the first flat bars remains constant within the entire storage device.

The invention also relates to a container for storing and/or transporting nuclear fuel assemblies, the container comprising a cavity wherein a storage device as described above is housed.

The invention also relates to a package comprising such a container, as well as nuclear fuel assemblies arranged in adjacent housings of the storage device of this container.

Further advantages and features of the invention will emerge in the non-limiting detailed description below.

BRIEF DESCRIPTION OF THE DRAWINGS

This description will refer to the appended drawings wherein.

DETAILED DESCRIPTION OF PREFERRED EMBODIMENTS

Figure 1:
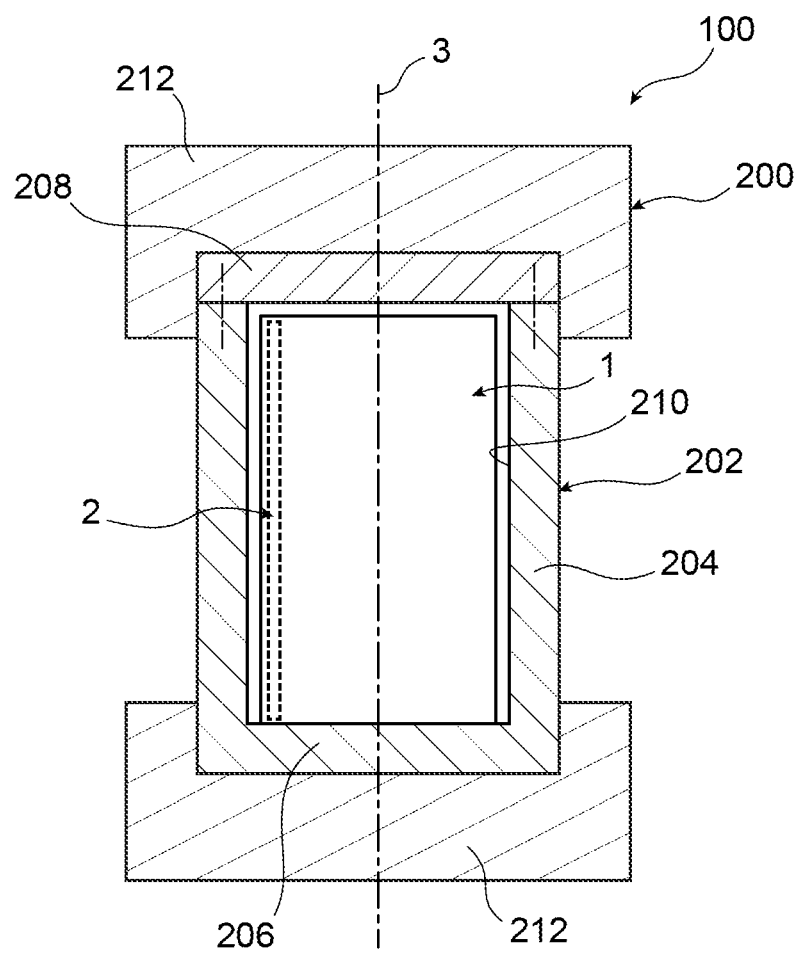
FIG. 1 represents a schematic sectional view of a package according to the invention, in particular comprising a storage device for storing and/or transporting nuclear fuel assemblies.

With reference to FIG. 1, a package 100 comprising a container 200 for storing and/or transporting irradiated nuclear fuel assemblies 2 is represented. The container 200 has a body 202 formed by a side body 204, a bottom 206, and a removable lid 208. The bottom 206 and the lid 208 are spaced apart from one another along the central longitudinal axis 3 of the container, about which the lateral body 204 extends.

The container 200 defines inside the body thereof a cavity 210, wherein a storage device 1, which will be referred to as "basket" hereinafter in the description, is housed. As will be detailed hereinafter, the basket 1 comprises a plurality of adjacent housings each intended to receive one of the nuclear fuel assemblies 2. When the basket 1 is housed in the cavity 210 of the container 200, and the nuclear fuel assemblies 2 are placed in the adjacent housings of the basket 1, the package 100 is referred to as "loaded".

By way of indication, it is noted that at the axial ends of the container, the latter can have shock-absorbing covers 212, respectively covering the lid 208 and the bottom 206 of the body 202 of this container.

The specificity of the invention lies in the design of the basket 1 for transporting and/or storing irradiated nuclear fuel assemblies, which will now be described with reference firstly to FIGS. 2 and 3.

Figure 2:
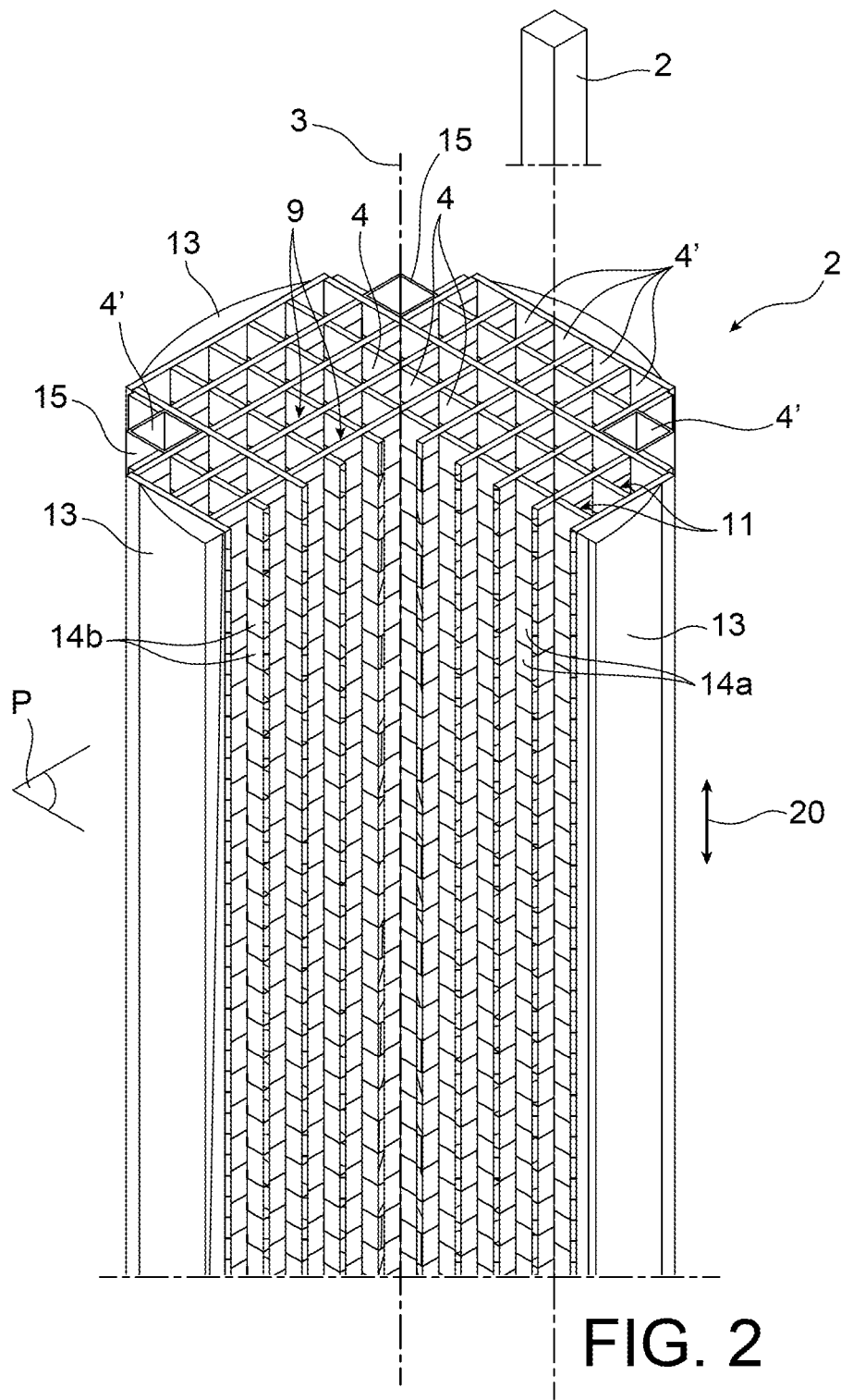
FIG. 2 represents a partial perspective view of the storage device, according to a first preferred embodiment of the present invention.
Figure 3:
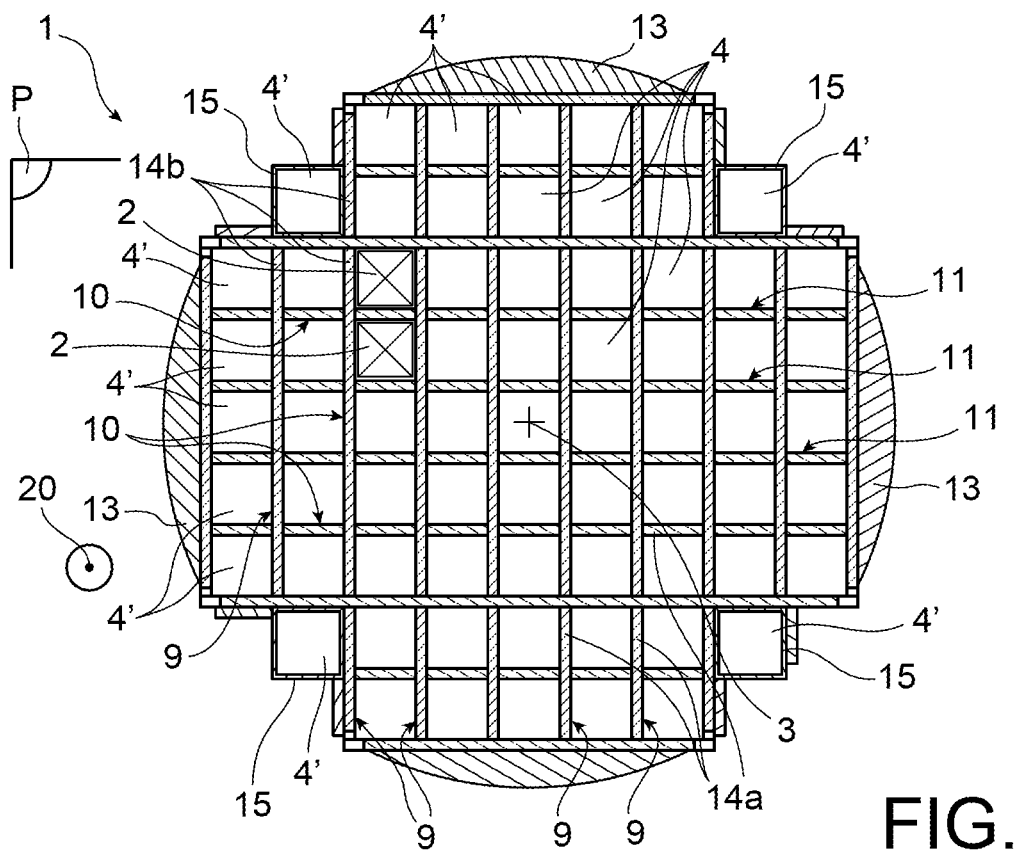
FIG. 3 is a partial transverse sectional view along the transverse plane P in FIG. 2.

As seen in FIGS. 2 and 3, the basket 1 comprises a plurality of adjacent housings 4, 4' disposed parallel with the axis 3, the latter also corresponding to the central longitudinal axis of the basket.

The number N of adjacent housings is here sixty-nine, but this number could obviously differ, for example by being between ten and one hundred.

The housings 4, 4' are each capable of receiving at least one fuel assembly 2 having a square cross-section, and preferably only one. Hence, they each have an inner housing delimiting surface 10, having a transverse cross-section of square or rectangular general shape. The term "inner housing delimiting surface 10" denotes the surface of the basket elements which is located directly facing the outer surface of the fuel assemblies 2, as represented for two thereof in FIG. 3.

The housings 4, 4' are therefore provided so as to juxtaposed with one another. They are produced by means of a plurality of mutually parallel first separating partitions 9, and a plurality of mutually parallel second separating partitions 11, perpendicular to the first partitions 9.

The first and second partitions 9, 11 are all parallel with the axis 3. In the embodiment shown in FIGS. 2 and 3, eight first partitions 9, and eight second partitions 11 are provided. These partitions 9, 11 are completed by four peripheral partitions 13, as well as by four tubes 15 each forming a peripheral housing 4'. In this regard, it is noted that the N adjacent housings are divided into a number N1 of peripheral housings 4', and a number N2 of inner housings 4. Here, it consists of twenty-four peripheral housings 4', and forty-five inner housings 4. The term "peripheral housings" denotes housings traversed by an imaginary peripheral line of the basket 1, and defining a closed peripheral row of housings 4', wherein the inner housings 4 are circumscribed. Thus, the N1 peripheral housings 4' are here divided into four peripheral segments of five housings 4', and into four housings 4' each defined by one of the tubes 15 arranged between the ends of said peripheral segments.

The first and second separating partitions 9, 11 are produced using flat bars 14a, 14b stacked along the axis 3, and interlocked. More specifically, this stack of flat bars with notches makes it possible to delimit all of the N2 inner housings 4, and they also contribute in part to delimiting the peripheral housings 4', with the exception of those defined by the tubes 15.

Figure 4:
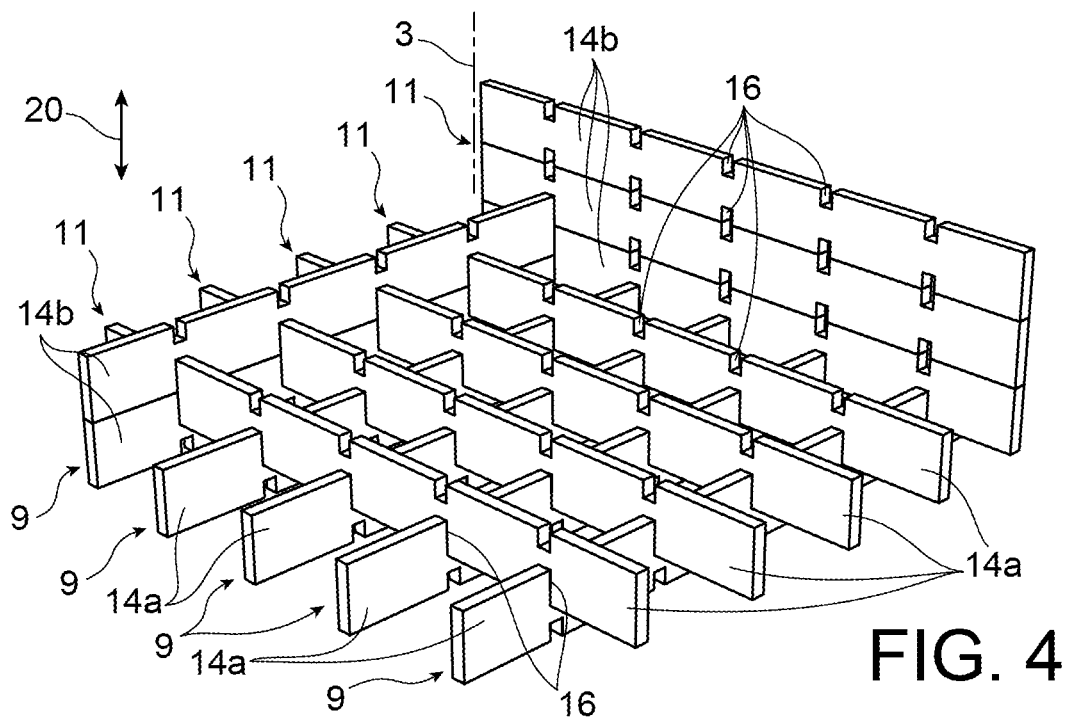
FIG. 4 represents a perspective view of a part of the storage device shown in FIGS. 2 and 3.

As seen in FIG. 4 only showing some of the flat bars 14a, 14b of the basket 1, each of them has notches 16 on the bottom and top edges thereof. The notches 16 of the flat bars 14a, 14b then cooperate pairwise to form the so-called "matrix" structure, wherein the flat bars 14a, 14b are stacked and interlocked orthogonally.

In this first preferred embodiment, each partition 9, 11 resulting from stacking and interlocking the flat bars 14a, 14b, is preferably formed by the series of several first flat bars 14a, or by the series of several second flat bars 14b. Each partition thus formed then extends along the entire height of the basket 1, and along substantially this entire height, the direction of which is parallel with the axis 3. In the transverse direction, each separating partition 9, 11 also extends locally along the entire width of the basket 1, and the same applies for each flat bar 14a, 14b forming these partitions. The first and second flat bars 14a, 14b are thus stacked along a stacking direction 20 corresponding to the direction of the height of the basket 1, parallel with the axis 3. Preferably, all the first flat bars 14a are made of a single material, in the same way as all the second flat bars 14b are made of a single material different from that of the first flat bars.

In the case of the first flat bars 14a, they comprise boron. They are preferably made of one piece, from an aluminium alloy including boron. Boron can then be distributed homogeneously in the flat bar 14a, or heterogeneously. The boron content in the alloy is adapted according to several criteria such as the sought effective multiplication factor "Keff", the ratio between the number of first flat bars 14a and the number of second flat bars 14b, the position of the first flat bars 14a inside the basket, etc. By way of indicative example, the mass boron content can attain 16% or more in the alloy, but this value can also be reduced to merely a few percent.

Alternatively, instead of being one-piece, each first flat bar 14a could be a one-piece flat bar provided with a surface coating comprising boron. In this scenario, the one-piece flat bar could be made of aluminium alloy, and the coating could be deposited according to any known techniques, such as for example hot or cold sputtering of boron carbide particles.

Preferably, the boron content is identical or substantially identical for all the first flat bars 14a of the basket 1.

In the case of the second flat bars 14a, they are devoid of boron. They are also devoid of any other neutron-absorbing element, i.e. free from neutron-absorbing elements. The term "neutron-absorbing elements" denotes elements which have an effective cross-section greater than 100 barns for thermal neutrons. By way of indicative examples, this consists of aluminium alloy devoid of boron, gadolinium, hafnium, cadmium, indium, etc.

For the second flat bars 14b, they are preferably made of an aluminium alloy, but therefore devoid of boron.

In this regard, it is noted that "flat bar" denotes an element of planar general shape, the thickness of which between the opposite surfaces thereof is of a dimension less than each of the dimensions in the two other directions orthogonal to the thickness direction, and orthogonal to each other. Furthermore, for each flat bar, it may consist of a single flat element, or of an overlay of several flat elements, in the direction of the thickness. According to another alternative, it can consist of a tubular element containing a flat bar of complementary cross-section. Each flat bar is preferably solid or substantially solid, apart from the hollowed zones forming the notches.

One of the specificities of the invention lies in making a judicious choice between the first and the second flat bars 14a, 14b to produce each of the partitions 9, 11 of the basket 1. As a general rule, the density of partitions produced from the first flat bars 14a comprising boron is higher at the centre of the basket, than at the periphery thereof. Also, some inner 4 and peripheral 4' housings are produced by combining first flat bars 14a comprising boron, and second flat bars 14b devoid of boron.

Figure 5:
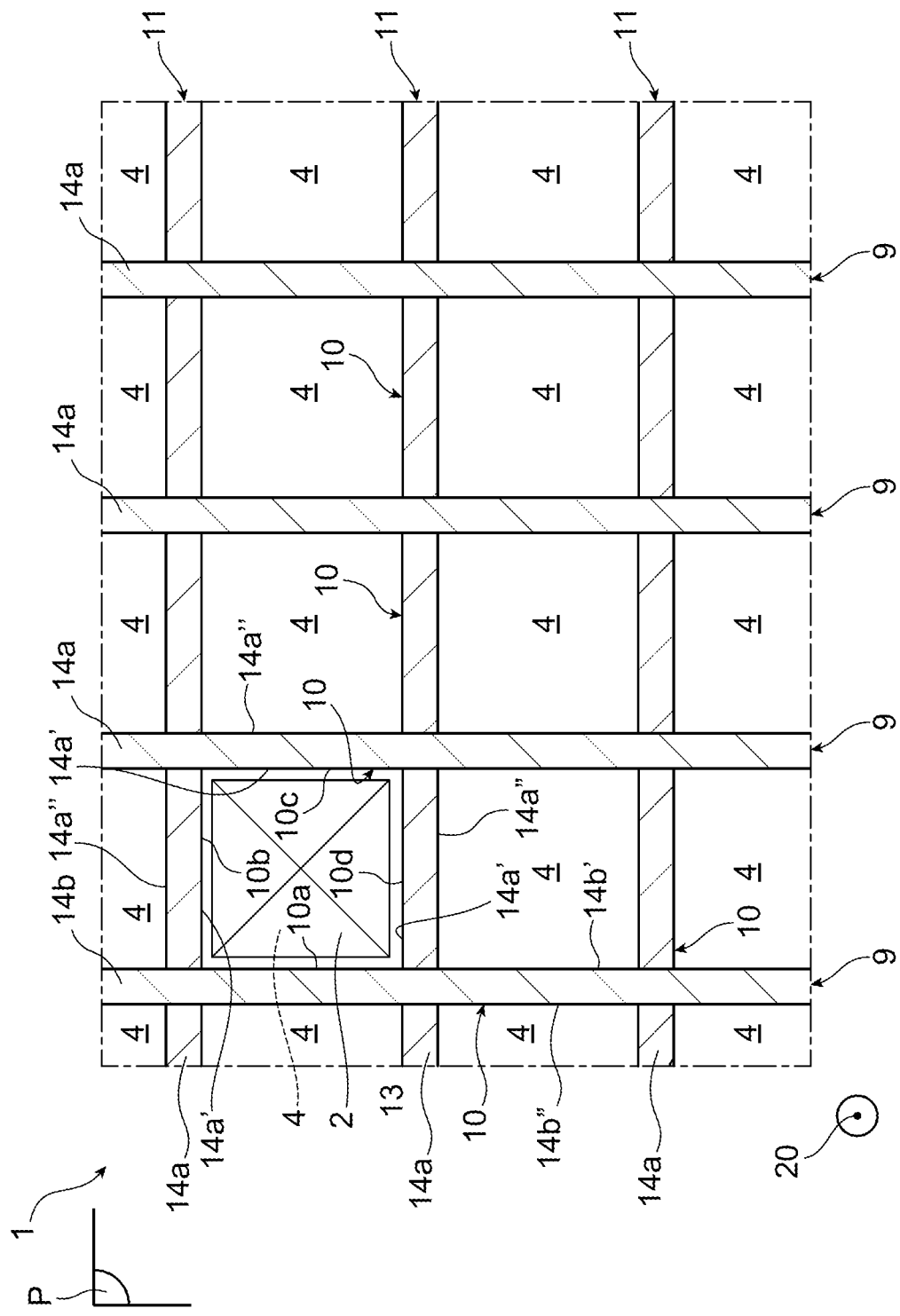
FIG. 5 is an enlarged partial view of that shown in FIG. 3.

More specifically, in at least one transverse plane of the basket 1 such as the cutting plane P in FIG. 5, and preferably in all these transverse planes or substantially all these transverse planes of the basket 1, the inner housing delimiting surface 10 of at least one of the N2 inner housings 4 is formed in part by a first flat bar 14a, and a second flat bar 14b.

To explain the design more specifically, reference will be made to the housing 4 in FIG. 5, wherein the fuel assembly 2 has been represented. For this housing 4, in the transverse plane of the basket, the inner housing delimiting surface 10 thereof is formed by four sides 10a, 10b, 10c, 10d respectively formed by a second flat bar 14b and three flat bars 14a.

More specifically, again in the transverse plane, the first side 10a of the inner housing delimiting surface 10 is produced by a first surface 14b' of the second flat bar 14b. It should be noted that the second surface 14b" of said second flat bar 14b, opposite the first surface 14b', also contributes to the formation of the inner housing delimiting surface 10 of one or more other adjacent housings 4, 4' of the basket. Similarly, the second, third and fourth sides 10b, 10c, 10d of the inner housing delimiting surface 10 are respectively produced by a first surface 14a' of three first flat bars 14a. The second surface 14a" of each of these first flat bars 14a, opposite the first surface 14a', also contributes to the formation of the inner housing delimiting surface 10 of one or more other adjacent housings 4, 4' of the basket.

Thus, even if some housings 4 arranged near or on the centre of the basket 1 can be produced solely from first flat bars 14a, those located more towards the periphery can result from a combination between one or more partitions produced from first flat bars 14a, and one or more partitions produced from second flat bars 14b.

In the example of the loaded housing 4 in FIG. 5, it consists therefore of a single separating partition 9 produced from second flat bars 14b devoid of boron, and of three separating partitions 9, 11 produced from first flat bars 14a comprising boron. Alternatively, for these inner housings 4 resulting from a combination between partitions of different types, it could consist of two separating partitions 9, 11 produced from second flat bars 14b devoid of boron, and of two separating partitions 9, 11 produced from first flat bars 14a comprising boron. In the latter case, the partitions of the same types could be directly consecutive and orthogonal in pairs, or parallel in pairs.

As seen above, in a transverse cross-section such as those in FIGS. 3 and 5, the inner delimiting surface 10 of several housings 4, 4' takes the form of four line segments 10a-10d, corresponding respectively to the relevant surfaces 14a', 14a", 14b', 14b" of the flat bars 14a, 14b.

Preferably, combining separating partitions 9, 11 of different types relates to at least 50% of the N housings 4, 4' of the basket, and at least 50% of the peripheral housings 4'. It is moreover noted that some of these housings 4' are also closed by peripheral partitions 13, for example made of aluminium alloy.

Thanks to this combination of separating partitions 9, 11, some of which contain boron and others not, the manufacturing costs are reduced while obtaining high performances in terms of maintaining subcriticality.

Figure 6:
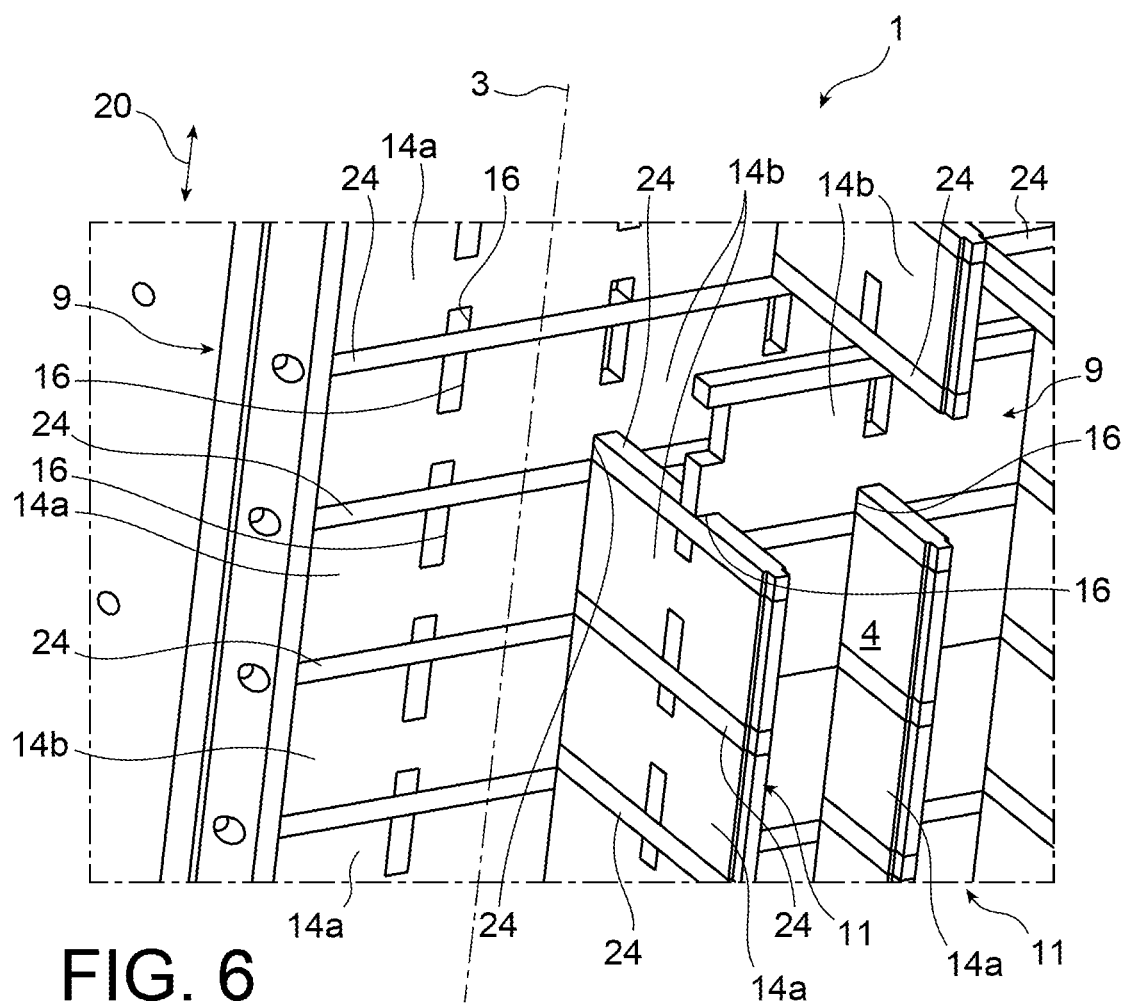
FIG. 6 represents a similar enlarged partial view to that of FIG. 2, with the storage device presented in the form of a second preferred embodiment of the invention.

According to a second embodiment shown in FIG. 6 and still complying with the general principle of the invention, the separating partitions are not all necessarily produced with the same type of flat bars 14a, 14b. Indeed, at least some of these separating partitions 9, 11 are produced by alternating first flat bars 14a and second flat bars 14b, along the stacking direction 20. In this case, structural elements 24 can be introduced into the stack between two directly consecutive flat bars 14a, 14b, as shown in FIG. 6. These structural elements 24, preferably made of steel, can take the form of bars inserted into the notches 16 of the flat bars 14a, 14b.

Obviously, various modifications can be made by a person skilled in the art to the storage devices 1 described above, merely by way of non-limiting examples.

What is claimed is:

1. Storage device for transporting and/or storing nuclear fuel assemblies, the storage device configured to be housed in the cavity of a container for transporting and/or storing nuclear fuel assemblies, the storage device including a number N of adjacent housings, each intended to receive a nuclear fuel assembly,
at least some of the N adjacent housings being produced from flat bars with notches, interlocked and stacked along a stacking direction parallel with a central longitudinal axis of the storage device,
wherein at least one transverse plane of the storage device passing through the N adjacent housings, at least one of these adjacent housings has an inner housing delimiting surface formed in part by:
a first surface of a first flat bar with notches, the first flat bar produced with boron, and a second surface of the first flat bar opposite the first surface contributes to the formation of the inner housing delimiting surface of one or more others of the N adjacent housings; and
a first surface of a second flat bar with notches, the second flat bar produced without boron, and a second surface of the second flat bar opposite the first surface contributes to the formation of the inner housing delimiting surface of one or more others of the N adjacent housings.

2. The storage device according to claim 1, wherein each of a plurality of transverse planes of the storage device passing through each of the N adjacent housings, at least one of these adjacent housings has an inner housing delimiting surface formed in part by:
a first surface of a first flat bar with notches, the first flat bar produced with boron, and a second surface of the first flat bar opposite the first surface contributes to the formation of the inner housing delimiting surface of one or more others of the N adjacent housings; and
a first surface of a second flat bar with notches, the second flat bar produced without boron, and a second surface of the second flat bar opposite the first surface contributes to the formation of the inner housing delimiting surface of one or more others of the N adjacent housings.

3. The storage device according to claim 1, wherein the N adjacent housings are divided into peripheral housings and inner housings, and in that in a transverse plane or in each of a plurality of transverse planes of the storage device passing through each of the N adjacent housings, at least 50% of the peripheral housings each have an inner housing delimiting surface formed in part by:
a first surface of a first flat bar with notches produced with boron, and a second surface of the first flat bar opposite the first surface contributes to the formation of the inner housing delimiting surface of one or more others of the N adjacent housings; and
a first surface of a second flat bar with notches produced without boron, and a second surface of the second flat bar opposite the first surface contributes to the formation of the inner housing delimiting surface of one or more others of the N adjacent housings.

4. The storage device according to claim 1, wherein in a transverse plane or in each of a plurality of transverse planes of the storage device passing through each of the N adjacent housings, at least 50% of the N adjacent housings each have an inner housing delimiting surface formed in part by:
- a first surface of a first flat bar with notches produced with boron, and a second surface of the first flat bar opposite the first surface contributes to the formation of the inner housing delimiting surface of one or more others of the N adjacent housings; and
- a first surface of a second flat bar with notches produced without boron, and a second surface of the second flat bar opposite the first surface contributes to the formation of the inner housing delimiting surface of one or more others of the N adjacent housings.

5. The storage device according to claim 1, wherein in a transverse plane or in each of a plurality of transverse planes of the storage device passing through each of the N adjacent housings, at least one of these adjacent housings has an inner housing delimiting surface having a square or rectangular general cross-section, and formed by:
- a first surface of a first flat bar with notches produced with boron, and a second surface of the first flat bar opposite the first surface contributes to the formation of the inner housing delimiting surface of one or more others of the N adjacent housings;
- a first surface of a second flat bar with notches produced without boron, and a second surface of the second flat bar opposite the first surface contributes to the formation of the inner housing delimiting surface of one or more others of the N adjacent housings; and
- two other flat bars with notches, and in that the first flat bar, the second flat bar and the two other flat bars respectively form the four sides of the inner housing delimiting surface having a square or rectangular general cross-section.

6. The storage device according to claim 5, wherein said two other flat bars with notches are formed respectively by:
- two first flat bars with notches produced with boron; or
- two second flat bars with notches produced without boron; or
- a first flat bar with notches produced with boron and a second flat bar with notches produced without boron.

7. The storage device according to claim 1, wherein at least a first flat bar with notches is produced in one piece and/or in that at least a first flat bar with notches is provided with a coating comprising boron.

8. The storage device according to claim 1, wherein at least a second flat bar with notches is made of an aluminium alloy devoid of boron.

9. The storage device according to claim 1, wherein the stacked and interlocked flat bars form together partitions for separating the adjacent housings, each partition extending along the entire height of the storage device or along substantially this entire height, and at least one partition being formed:
- by the stack of first flat bars with notches; or
- by the stack of second flat bars with notches; or
- by alternating first and second flat bars with notches; or
- by alternating first and second flat bars with notches, between which structural elements are also arranged.

10. Container for storing and/or transporting nuclear fuel assemblies, the container comprising a cavity wherein a storage device according to claim 1 is housed.

11. Package comprising a container according to claim 10 and nuclear fuel assemblies arranged in the adjacent housings of the storage device of this container.

12. The storage device according to claim 1, wherein each of a plurality of housings from these N adjacent housings has an inner housing delimiting surface formed in part by:
- a first surface of a first flat bar with notches, the first flat bar produced with boron, and a second surface of the first flat bar opposite the first surface contributes to the formation of the inner housing delimiting surface of one or more others of the N adjacent housings; and
- a first surface of a second flat bar with notches, the second flat bar produced without boron, and a second surface of the second flat bar opposite the first surface contributes to the formation of the inner housing delimiting surface.

13. The storage device according to claim 1, wherein each of a plurality of transverse planes of the storage device passing through each of the N adjacent housings, each of a plurality of housings from these N adjacent housings has an inner housing delimiting surface formed in part by:
- a first surface of a first flat bar with notches, the first flat bar produced with boron, and a second surface of the first flat bar opposite the first surface contributes to the formation of the inner housing delimiting surface of one or more others of the N adjacent housings; and
- a first surface of a second flat bar with notches, the second flat bar produced without boron, and a second surface of the second flat bar opposite the first surface contributes to the formation of the inner housing delimiting surface of one or more others of the N adjacent housings.

14. The storage device according to claim 1, wherein in a transverse plane or in each of a plurality of transverse planes of the storage device passing through each of the N adjacent housings, each of a plurality of housings from these N adjacent housings has an inner housing delimiting surface having a square or rectangular general cross-section, and formed by:
- a first surface of a first flat bar with notches produced with boron, and a second surface of the first flat bar opposite the first surface contributes to the formation of the inner housing delimiting surface of one or more others of the N adjacent housings;
- a first surface of a second flat bar with notches produced without boron, and a second surface of the second flat bar opposite the first surface contributes to the formation of the inner housing delimiting surface of one or more others of the N adjacent housings; and
- two other flat bars with notches, and in that the first flat bar, the second flat bar and the two other flat bars respectively form the four sides of the inner housing delimiting surface having a square or rectangular general cross-section.

15. The storage device according to claim 7, wherein the flat bars include first flat bars with notches produced with boron having the same boron content.

16. The storage device according to claim 7, wherein the first flat bar with notches is produced in one piece from an aluminium alloy comprising boron.

17. The storage device according to claim 7, wherein the first flat bar with notches is provided with a coating comprising boron applied on an aluminium alloy material.

18. The storage device according to claim 1, wherein the stacked and interlocked flat bars form together partitions for separating the adjacent housings, each partition extending along the entire height of the storage device or along substantially this entire height, and at least one partition being formed by alternating first and second flat bars with notches, between which structural elements made of steel, are also arranged.

\* \* \* \* \*